United States Patent
Taketa et al.

(10) Patent No.: US 7,281,019 B2
(45) Date of Patent: Oct. 9, 2007

(54) METHOD AND SYSTEM FOR MANAGING CASES

(75) Inventors: Masakatsu Taketa, Hiroshima (JP); Kaori Arihiro, Hiroshima (JP); Hiroshi Ishizaki, Kure (JP); Hisashi Kunieda, Gifu (JP); Tsutomu Munemoto, Nagoya (JP); Masayuki Kamiya, Kawasaki (JP); Yoshiki Hayashi, Kawasaki (JP)

(73) Assignees: Kabushiki Kaisha Onda Techno, Gifu-ken (JP); Daiko Co., Ltd., Hiroshima-ken (JP)

( * ) Notice: Subject to any disclaimer, the term of this patent is extended or adjusted under 35 U.S.C. 154(b) by 261 days.

(21) Appl. No.: 10/255,570

(22) Filed: Sep. 26, 2002

(65) Prior Publication Data

US 2003/0105738 A1 Jun. 5, 2003

(30) Foreign Application Priority Data

Sep. 27, 2001 (JP) ............................. 2001-297354
Sep. 25, 2002 (JP) ............................. 2002-279986

(51) Int. Cl.
G06F 7/00 (2006.01)
(52) U.S. Cl. ............................ 707/104.1; 707/1; 707/5
(58) Field of Classification Search ............. 707/104.1, 707/5; 709/200
See application file for complete search history.

(56) References Cited

U.S. PATENT DOCUMENTS

2002/0035571 A1* 3/2002 Coult ...................... 707/104.1
2002/0099777 A1* 7/2002 Gupta et al. ................ 709/206
2002/0184234 A1* 12/2002 Lundberg ................ 707/104.1

FOREIGN PATENT DOCUMENTS

JP 10-283400 10/1998

* cited by examiner

*Primary Examiner*—Alford Kindred
*Assistant Examiner*—Belix M. Ortiz
(74) *Attorney, Agent, or Firm*—Patterson, Thuente, Skaar & Christensen, P.A.

(57) ABSTRACT

A case management method that reduces the number of manual operations, prevents manual errors, guarantees updated data, and enables knowledge of the present location of a storage file. In the case management method, case information involving a processing deadline is input to the management computer. At least one event, which is a task including a single operation and involving the processing deadline or a task including a series of operations and involving the processing deadline, is generated. Workflows, which are series of operations performed in a section that is determined beforehand in accordance with the type of generated event, are stored in a database. A predetermined workflow is selected from the stored workflow. An event pool storing the generated event in association with the selected predetermined workflow is generated in the database.

35 Claims, 10 Drawing Sheets

Terminal Management Page  42

Prior Processing Event  42a

| NO. | File NO. | Task | Deadline |
|---|---|---|---|
| 1 | P003 | Argument | 2001.4.1 |
| 2 | P005 | Argument | 2001.4.7 |
| 3 | P009 | Amendment | 2001.4.14 |
| 4 | P011 | Translation | 2001.4.21 |
|   |   |   |   |

Processing Event  42b

| NO. | File NO. | Task | Deadline |
|---|---|---|---|
| 1 | P010 | File Opposition | 2001.3.20 |
|   |   |   |   |
|   |   |   |   |
|   |   |   |   |
|   |   |   |   |

Return

|   |   |   |   |
|---|---|---|---|
|   |   |   |   |
|   |   |   |   |
|   |   |   |   |
|   |   |   |   |
|   |   |   |   |

Completed Event  42c

| NO. | File NO. | Task | Deadline |
|---|---|---|---|
| 1 | P110 | Argument | 2001.3.1 |
| 2 | P014 | Search | 2001.3.2 |
|   |   |   |   |
|   |   |   |   |
|   |   |   |   |

Progress Page 22

| NO. | File NO. | Task | Staff Member | Operation | Present Status | Deadline | Remaining Days |
|-----|----------|------|--------------|-----------|----------------|----------|----------------|
| 001 | P021 | 501 Rejection | A | 01 | 01 | | |
| 002 | P021 | 50101 Argument | B | | | | |
| 003 | U030 | 601 Notice Of Allowance | A | | | | |
| 004 | U030 | 60101 Pay Fee | A | | | | |
| 005 | E123 | 701 | C | | | | |

Application File

| File NO. | |
|---|---|
| Country Code | |
| Type Of Intellectual Property Law | |
| Route | |
| Type Of Application | |
| Filing Date | |
| ⋮ | |

Fig.12

Event Master 32

| Country Code | |
|---|---|
| Type Of Intellectual Property Law | |
| Route | |
| Task ID | |
| Task Name | |
| Deadline Calculation | |
| Calculation Pattern | |
| Country Code | |
| Type Of Intellectual Property Law | |
| Route | |
| Next Operation ID | |

Fig.13

Workflow Definition 33

| Pattern NO. | |
|---|---|
| Order | |
| Operation Classification | |
| Operation Code | |
| Staff Member Selection Classification | |
| Comment | |

Fig.14

Pattern Definition 34

| Pattern NO. | |
|---|---|
| Pattern Name | |
| Country Code | |
| Type Of Intellectual Property Law | |
| Route | |
| Task ID | |

Fig.15

Event Pool 35

| Successive NO. | |
|---|---|
| Present Operation Pattern NO. | |
| Present Order | |
| Status Classification | |
| Task ID | |
| File NO. | |
| Supplemental Task Name | |
| Deadline | |
| Statutory Deadline | |
| Registration Date | |
| Base Date | |
| Completion Date | |
| Staff Member | |
| Initiation Date | |

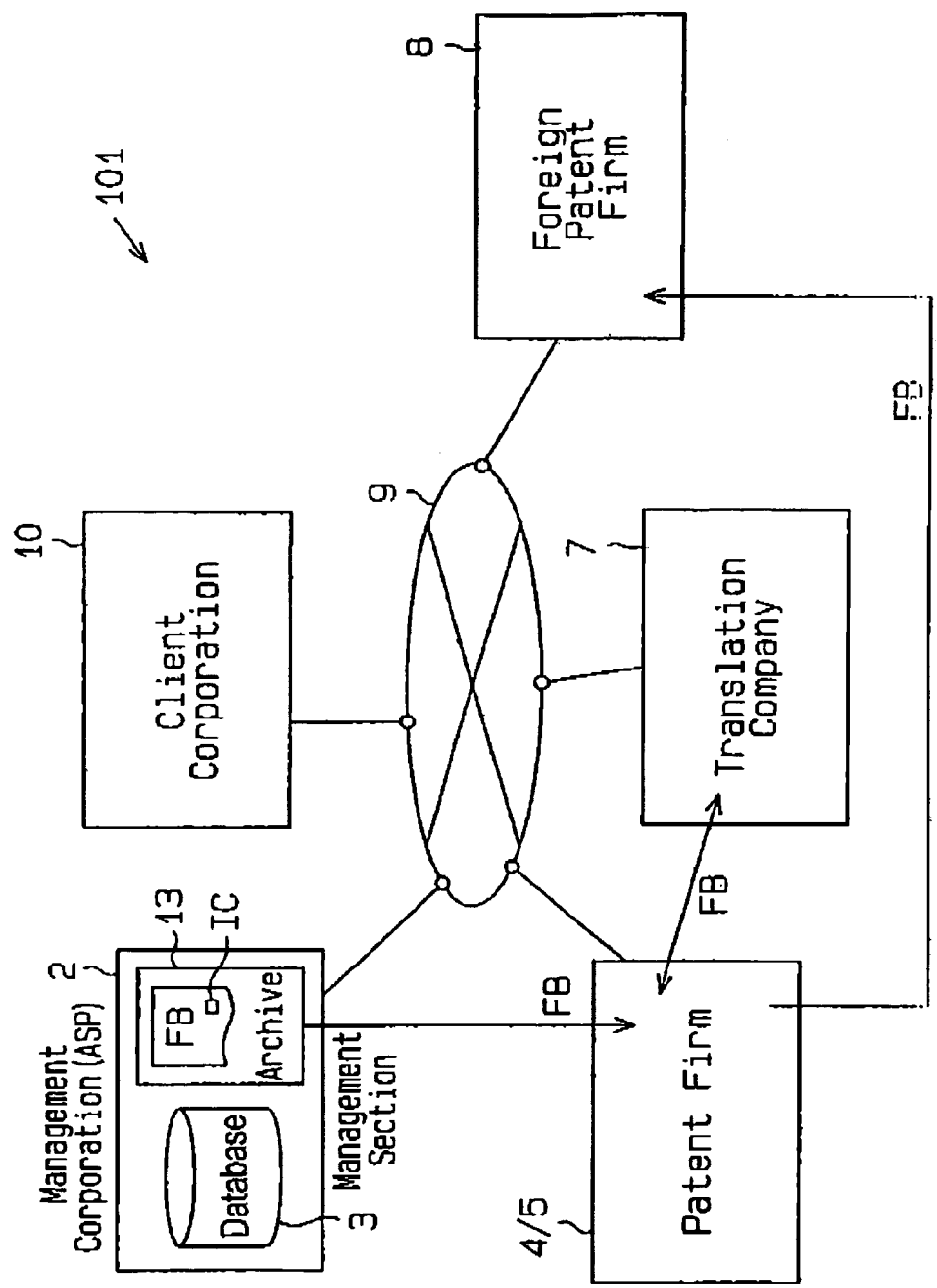

METHOD AND SYSTEM FOR MANAGING CASES

BACKGROUND OF THE INVENTION

The present invention relates to a method and system for managing cases having deadlines with a computer.

In a prior art case management system, such as a patent management system, a file number is assigned to each case that is related with patent prosecution. Bibliographic information, such as filing date and application number, is recorded in a case file, which is a database and referred to as an application master, in accordance with the file number. When filing a request for examination or receiving an office action, mailed documents and received documents are recorded as a history. When doing so, the file number, application number, or other type of number is used to read the bibliographic information of the case from the application master and history information is recorded additionally to the bibliographic information.

When performing patent management that includes the management of processing deadlines, tasks are divided between a plurality of processing sections, such as a docketing section, a patent prosecution section, and a development section. When sending or receiving work between sections, a communicating means, such as a mailing system that uses electronic mail and is excluded from the above patent management system, is employed.

Further, in patent management, documents related with prosecution are normally kept in a paper file for management, which is referred to as a "file wrapper". However, since staff members may freely remove a file wrapper from an archive, the file wrapper may be lost. Thus, there is a storage file management system, which is referred to as a file wrapper management system. In the file wrapper management system, for example, a seal, on which a bar code is marked, is attached to a file wrapper, or a storage file, and the bar code is input to a computer to manage the file wrapper so that it does not become lost.

In a method that performs deadline management with a complex system, the following items are colleted when confirming a deadline. In other words, there is a method for processing deadlines for a case that collects deadlines during a designated period, file number (our reference No.), application number, title, and staff member in charge, which are collected from the application master to generate a deadline management list, and prints or displays the list (e.g., patent document 1). [Patent Document 1] Japanese Laid-Open Patent Publication No. 10-283400 (page 4, FIG. 12).

However, when integrating a plurality of systems and managing deadlines based on the deadline management list, history information input to the application master subsequent to the generation of the present deadline management list is checked. Thus, there is a shortcoming in that an updated deadline management list must be generated whenever the history information is checked.

Alternatively, a deadline management file, which is a database that differs from the application master, is generated beforehand. When inputting bibliographic information or event information in the application file, event information required for deadline management is also input to the deadline management file. When necessary, the deadline management file is printed or displayed to manage deadlines.

Updated information is always input when managing deadlines with the deadline management file. However, to generate the deadline management file beforehand, event information must be input in addition to the application master and results in a shortcoming in that this increases work.

When dividing tasks between sections, task instructions are given through the mail system. However, this results in a shortcoming in that it requires burdensome tasks, such as writing the required mail message in accordance with the task instruction and sending the mail to the necessary section.

When dividing work between sections and checking the location of a file wrapper with the bar code by means of the file wrapper management system, this results in a shortcoming in that further work becomes necessary, in which a bar code corresponding to the file number must be marked on each file wrapper.

Even if a patent management system for managing patent cases is configured from multiple systems, the multiple systems are not connected to each other. Thus, there is a problem in that the movement of file wrappers, which are managed files, must be managed manually in accordance with task instructions. Further, the deadline management must also be managed manually by means of the deadline management list or the deadline management file.

In addition to patent management systems, for cases undergoing the prior art management system, in which paper medium documents are moved when processing the management file and many people are involved in the processing of the management file, the system becomes complex. Thus, there is a shortcoming in that the large amount of data input manually may result in human errors and that management errors may occur due to the human management.

SUMMARY OF THE INVENTION

It is an object of the present invention to provide a case management method, case management program, and case management system that reduces the number of manual operations, prevents input errors, guarantees updated data, and maintains knowledge of the present location of a storage file.

To achieve the above object, one aspect of the present invention provides a method for managing case information with a management computer connected to a database. The method includes the steps of inputting case information involving a processing deadline in the management computer, generating at least one event, which is a task including a single operation and involving a processing deadline or a task including a series of operations and involving the processing deadline, storing workflows, which are series of operations performed in a section that is determined beforehand in accordance with the type of the generated event, in the database, selecting a predetermined workflow from the stored workflows, and generating an event pool storing the generated event in association with the selected predetermined workflow in the database.

It is preferred that the method further includes the step of calculating the processing deadline based on a predetermined reference deadline in accordance with the case information and automatically setting the calculated processing deadline.

It is preferred that, in the method, at least one terminal device is arranged in a task section that performs a corresponding task, the terminal device being enabled to communicate with the management computer via the network, and that the method further includes the step of displaying a management page including the event stored in the event pool on a display of the at least one terminal device in accordance with the workflow stored in association with the event.

It is preferred that the step for displaying the event further includes receiving confirmation of initiation of a task related to the event from the terminal device. The step for displaying the event includes displaying a prior processing event prior to the initiation and a processing event subsequent to the initiation in a distinguishable manner on the management page in accordance with the confirmation of the initiation to show a processing stage of the event.

It is preferred that the step for displaying the event further includes the steps of receiving confirmation of completion of processing of the task related to the event from the terminal device, deleting the processing event for which processing has been completed from the management page and displaying the event as a completed event in accordance with the confirmation of completion of processing, displaying the completed event as a prior processing event on a management page of a section that performs the next operation in accordance with the workflow, and deleting the display of the completed event after the confirmation process is performed in the section that performs the next operation.

It is preferred that the step for displaying the event includes displaying the prior processing event, the processing event, and the completed event in different windows on the management page in order of processing deadlines in accordance with the processing stage.

It is preferred that the further includes the step of displaying a progress page, which includes a list showing a progress status of the event that indicates the processing deadline, the section in which the event is shown, and the processing stage in the section, on at least one of a display of the management computer and a display of the at least one terminal device.

It is preferred that the method further includes the steps of recording the workflow in a task instructing means attached to storage file that stores a document related to the event. The storage file includes an identifying means for identifying the event related with the storage file, and recording information related with the event in the identifying means.

It is preferred that the management computer is connected to at least one terminal device that processes the event through a communication network. The identifying means is a barcode, and wherein the at least one terminal device includes a barcode reader.

It is preferred that in the method, the identifying means is an electric, magnetic, or optical storage medium, and that the method further includes reading from the storage medium in the at least one terminal device.

It is preferred that the method further includes the step of identifying the event with the identifying means in the at least one terminal device to perform a confirmation process that confirms initiation of a task related with the event or a completion process that confirms completion of a task related with the event.

It is preferred that the method further includes the step of storing a case file, which stores bibliographic information and history information for each case, in the database. The step for storing the case file includes adding the history information to the bibliographic information for the case file by identifying the event by means of the identifying means.

To achieve the above object, a further aspect of the present invention is a program for operating a computer that is connected to a database and manages case information. The program having the computer function as an event generating means for generating at least one event, which is a task including a single operation and involving a processing deadline or a task including a series of operations and involving the processing deadline, in accordance with input case information, which involves the processing deadline, a workflow storing means for storing workflows, which are series of operations performed in a section that is determined beforehand in accordance with the type of generated event, in the database, a workflow selecting means for selecting a corresponding workflow from the workflows stored in the database in accordance with the type of the generated event, and an event storing means for storing the generated event in the database in association with the workflow selected by the workflow selecting means.

To achieve the above object, a further aspect of the present invention provides a case management system including a management computer and a database connected to the management computer. The management computer includes an event generating means for generating at least one event, which is a task including a single operation and involving a processing deadline or a task including a series of operations and involving the processing deadline, in accordance with received case information, which involves the processing deadline. The database includes a workflow storing means for storing workflows, which are a series of operations performed in a section that is determined beforehand in accordance with the type of generated event, in the database. Further, the management computer includes a workflow selecting means for selecting a corresponding workflow from the workflow storing means in accordance with the type of the generated event. The database includes an event pool for storing the generated event in association with the workflow selected by the workflow selecting means.

Other aspects and advantages of the present invention will become apparent from the following description, taken in conjunction with the accompanying drawings, illustrating by way of example the principles of the invention.

BRIEF DESCRIPTION OF THE DRAWINGS

FIG. 12 is an explanatory diagram schematically showing the stored contents for an event master in the case management system of FIG. 1.

FIG. 13 is an explanatory diagram schematically showing the stored contents of a workflow definition in the case management system of FIG. 1.

FIG. 14 is an explanatory diagram schematically showing the stored contents of a pattern definition in the case management system of FIG. 1.

FIG. 15 is an explanatory diagram schematically showing the stored contents of an event pool in the case management system of FIG. 1.

FIG. 16 is a schematic diagram schematically showing a modified example of a case management system according to the present invention.

Figure 1:
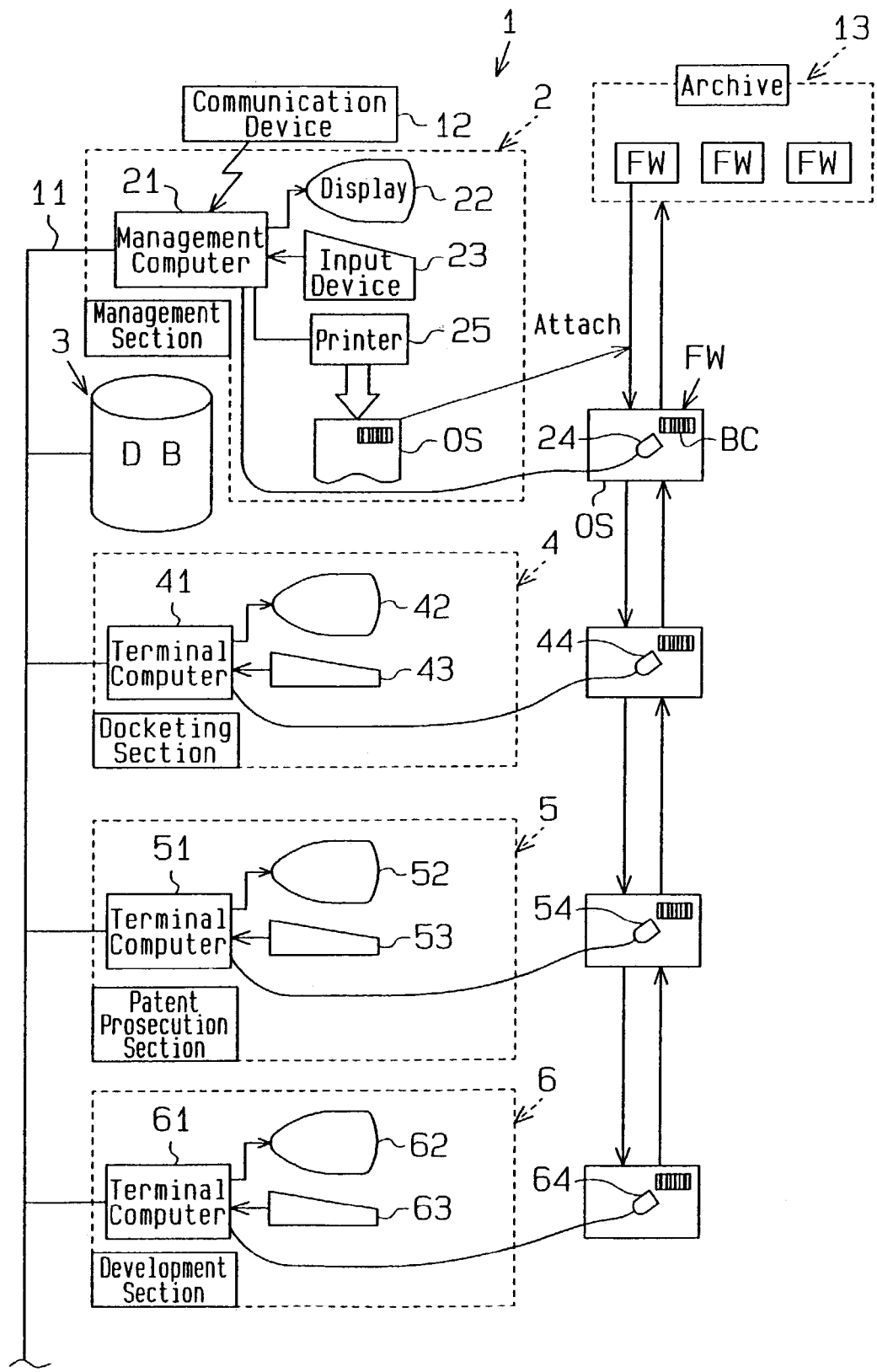
FIG. 1 is a schematic diagram of a case management system according to a first embodiment of the present invention.

The features of the present invention that are believed to be novel may be understood especially through the attached claims. The present invention, together with objects and advantages thereof, may best be understood by reference to the following description of the presently preferred embodiments together with the accompanying drawings.

DETAILED DESCRIPTION OF THE PREFERRED EMBODIMENTS (First Embodiment)

A case management system according to a first embodiment of the present invention, or a patent management system 1, will now be discussed with reference to FIGS. 1 through 15.

The patent management processed by the patent management system 1 will now be discussed. The term "case" in the present invention is not restricted to patents and broadly includes cases involving processing deadlines that must be processed. In the first embodiment, "patent management" is an example of "cases that must be processed in accordance with processing deadlines" and mainly refers to procedures related to patents that are taken with respect to the patent offices and courts of each country and that must be completed within a specified period. For example, for a patent application filed with the Japanese Patent Office, an office action may be issued as a result of an examination. Such information, which is related to patents or the like, and triggers work for an applicant or an agent is referred to as "patent information" in the present invention. As a result of the office action, which is patent information, the applicant or the applicant's agent records the receipt of the office action, and a procedure for filing an opinion in response to the office action becomes necessary. The filing of an amendment also becomes necessary. In some cases, the office action may not be contested and the application may be abandoned. In any event, such a determination must be made within a designated period.

Specifically, a process is performed based on documents kept in a file, which is referred to as a "file wrapper FW" corresponding to a storage file of the present invention. A large paper envelope is normally used as the file wrapper FW to hold a set of documents for the case that are printed on paper medium. The "storage file" of the present invention is not restricted to the "file wrapper FW" described here and a variety of matters may be employed as the "file wrapper FW." For example, files, such as a paper binder, a resin clear binder, a pipe file, a ring file, a punchless file, a clear file, or a box file may be employed. Alternatively, a scrapbook may be employed. Otherwise, a front page may be attached to the documents, and the documents may simply be clipped together or bound together with a string. Further, it is preferred that an IC card be incorporated as part of the storage file. The stored subject is not restricted to printed paper medium. Photographs, samples, or a recording medium, such as a CD, a CD-R/RW, a FD, an MD, a ZIP, an MO (Magneto Optical disk), a DVD-R, a memory card, or a magnetic tape, may be stored. Part of the storage file may be cut out or copied to generate two or more storage files.

In the patent management system 1 of the first embodiment, a single task is divided into operations as described below. For example, the tasks performed when receiving an office action include a single step task in which the receipt is recorded as an event within three days by the docketing section. Another task, or a procedure for responding to the office action is performed within 60 days or less in a series of steps by the docketing section and the patent prosecution section. The two tasks are represented as two different tasks each having a processing deadline.

In the present application, a single-step task resulting in a single processing deadline or a task including a series of operations is referred to as an "event." When an office action is received, which is patent information, two different events, which are "recording of receipt of office action" and "response to patent office", occur. The event in which the receipt of an office action is recorded is a task completed by a single operation in the docketing section. When the tasks related with a response to the office action is divided between the docketing section, the patent prosecution section, and the research section, the event is transferred from the docketing section to the patent prosecution section to prepare a response. When necessary, the development section that made the invention is requested to review the contents of the office action, and the patent prosecution section receives the review result and drafts an opinion or an amendment. The opinion and the amendment are returned to the docketing section and the documents are filed with the patent office. Such a series of processes, including multiple operations performed by more than one section, are performed within the designated period. A "single step" refers to a task for an event that is completed in a single section.

A "section" basically refers to a unit that processes an operation for an event. However, a single section may successively process a plurality of events. Alternatively, a plurality of sections may process a single event. Each section may be included in a single organization or be dispersed in different organizations. For example, an outside translator that prepares a translation, on outside organization that performs deadline management, and a search firm that conducts searches are also included in a "section." Accordingly, cases in which, for example, the "management section" is an outside organization is included.

A task involving a plurality of operations, such as coping with an office action, is processed in accordance with a routine procedure. That is, based on the information that is received as patent information, a workflow is patterned by specifying tasks in accordance with a document from the patent office, request from the applicant, type of communication from a foreign patent firm, country name, type of intellectual property law, filing route, and type of procedure. "Workflow" refers to a sequence of steps defined beforehand in accordance with the type of event. More specifically, the type of event is designated by the type of procedure in accordance with the country, the type of intellectual property law, the filing route, and the type of procedure, and the task that is to be processed for the event is analyzed. The order for the steps of a task is stored beforehand in a pattern definition 34 (refer to FIG. 14), and the details of the steps performed by the section in charge of a task is stored in a workflow definition 33 (refer to FIG. 13). The pattern definition 34 and the workflow definition 33 correspond to a workflow storage means of the present invention. A management computer 21 (refer to FIG. 1), which is a workflow selection means, selects a workflow, which is in accordance with the type of the generated event, from the pattern definition 34. The event is associated with the selected workflow pattern and stored in an event pool 35 (refer to FIG. 15). The event pool 35 stores file numbers, which are bibliographic information that is required for processing. By concentrating and processing information in a record for the event pool 35, a proper process corresponding to the patent information is automatically managed. The patent management system 1 of the first embodiment performs patent management in such a manner.

The configuration of the patent management system 1 of the first embodiment will now be discussed. FIG. 1 is a schematic diagram of the patent management system.

The patent management system 1 is configured in a manner dispersed between a management section 2, a docketing section 4, a patent prosecution section 5, and a development section 6. The patent management system 1 further includes a communication device 12 for receiving information from the patent office, an archive 13 for storing file wrappers FW, a database for storing data, and a local area network (LAN), which is a network connecting the sections 2, 4, 5, 6 and the database 3 in a manner enabling communication.

The first embodiment uses the LAN as the network. However, the "network" of the present invention includes anything that connects a plurality of terminal devices and a management computer in one way or another. For example, "network" includes a small-scale wire/wireless LAN based on the Ethernet (registered trademark), a leased line, a wide area network (WAN) based on a public line, and a virtual private network (VPN) based on the Internet. Further, "network" includes data communication that partially employs cellular phone lines.

The management section 2 is the section in which the staff member in charge of managing deadlines belongs. The management section 2 is provided with a management computer 21, which is a known type of personal computer. A server operating system (OS) is installed as a TCP/IP network server. When there is a request for a predetermined URL from terminal computers (terminal devices) 41, 51, 61, which are the terminal devices of each section, via a LAN 11, the management computer 21 functions as a server computer and sends predetermined information to the terminal computers 41, 51, 61, which are client computers. The management computer 21 includes a common gateway interface (CGI), executes a certain program in accordance with a predetermined request, and accesses the database 3. A patent management program, which is a file management program, is installed in the management computer 21 to realize the functions of the patent management system 1 in the first embodiment. The management computer 21 functions as various means in accordance with the patent management program.

A display device 22, for example, a CRT display, is connected to the management computer 21 to display images required for management. An input device 23, such as a keyboard and a mouse, is connected to the management computer 21. The input device 23 is used to input various types of information and operate the management computer 21. A printer 25, such as a laser printer, is connected to the management computer 21. The printer 25 prints various types of documents such as a task instruction OS. Further, the management computer 21 is connected to a bar code reader 24. The bar code reader 24 reads bar codes BC marked on the task instructions OS.

The task instruction OS is an example of a work instructing means of the present invention. The printer 25 is an example of a workflow recording means and an event recording means of the present invention, and the bar code BC is an example of an identifying means of the present invention. The task instruction means does not have to be printed material and may be anything that records a task instruction through an electric process, a magnetic process, an optical process, or any other process. The task instruction means may, for example, be an IC card.

Further, the identifying means does not have to be a bar code BS and may be anything that enables identification of an event such as an electric, magnetic, or optical recording medium. A reading device corresponding to the identifying means may be employed. Examples of the identifying means that perform identification through contact are an IC chip, which includes an EEPROM, or a flash memory that perform identification electrically, a magnetic strip that performs identification magnetically, or a one dimensional to two dimensional bar code that performs identification optically. Examples of the identifying means that perform identification through non-contact are a transponder that performs identification through electromagnetic waves, an optical character reader (OCR) that identifies characters, or infrared (IR) for enabling identification.

The database 3 is a database server, such as a large capacity hard disk drive (HDD) and is accessed from the management computer 21 and the terminal computers 41, 51, 61 via the LAN 11.

The docketing section 4 is provided with the terminal computer 41, which is a known type of personal computer. A web browser is installed in the terminal computer 41. The terminal computer 41 accesses the management computer 21 via the LAN 11 in accordance with the TCP/IP protocol.

The terminal computer 41 is connected to a display device 42, such as a CRT display, to display images required for management. An input device 43, such as a keyboard and a mouse, is connected to the terminal computer 41. The input device 43 is used to input various types of information and operate the terminal computer 41. The terminal computer 41 is connected to a bar code reader 44. The bar code reader 44 reads bar codes BC marked on the task instructions OS.

The patent prosecution section 5 is provided with the terminal computer 51, which is a known type of personal computer. A web browser is installed in the terminal computer 51. The terminal computer 41 accesses the management computer 21 via the LAN 11 in accordance with the TCP/IP protocol.

The terminal computer 51 is connected to a display device 52, such as a CRT display, to display images required for management. An input device 53, such as a keyboard and a mouse, is connected to the terminal computer 41. The input device 53 is used to input various types of information and operate the terminal computer 51. The terminal computer 51 is connected to a bar code reader 54. The bar code reader 54 reads bar codes BC marked on the task instructions OS.

The development section 6 is provided with the terminal computer 61, which is a known type of personal computer. A web browser is installed in the terminal computer 61. The terminal computer 41 accesses the management computer 21 via the LAN 11 in accordance with the TCP/IP protocol.

The terminal computer 61 is connected to a display device 62, such as a CRT display, to display images required for management. An input device 63, such as a keyboard and a mouse, is connected to the terminal computer 61. The input device 63 is used to input various types of information and operate the terminal computer 61. The terminal computer 61 is connected to a bar code reader 64. The bar code reader 64 reads bar codes BC marked on the task instructions OS.

The LAN 11 connects the management computer 21 to the database 3 and the terminal computers 41, 51, 61 through the Ethernet (registered trademark) in a manner enabling communication in accordance with the TCP/IP protocol. The communication device 12 may be, for example, a digital service unit (DSU), a terminal adapter (TA), a router, or a modem, and is connected to an integrated services digital network (ISDN). Alternately, the communication device 12 may be connected to the Internet. The communication device receives patent information from the patent office through the ISDN or the Internet.

The archive 13 provides space for storing file wrappers FW. The management section 2 manages the movement of the file wrappers FW into and out of the archive 13.

Although not shown in FIG. 1, the patent management system 1 may include other sections, such as a legal section, a manufacturing section, or an accounting section connected through the LAN 11. In this case, the patent management system 1 may perform legal reviews, technical reviews, and accounting processes.

The first embodiment is an example using a network configured by a LAN between different sections in a company. However, in the present invention, the "sections" do not have to be in a company. That is, the network may include outside companies or affiliated companies that are connected by communication devices.

The terminal devices of the present invention may be, for example, a notebook personal computer (PC), in which an input device and a display are formed integrally with each other, or a mobile PC. Further, the terminal device does not have to be a computer and may be a cellular phone or a personal digital assistant (PDA), which is provided with a communication function.

In addition to a laser scanner, which is optimal for reading a two dimensional bar code, a CCD camera may be used as the bar code reader. Further, an exclusive purpose bar code reader does not have to be used, and a mobile PC, a cellular phone, or a PDA, which incorporates a CCD camera may be used to read the bar codes.

Figure 2:
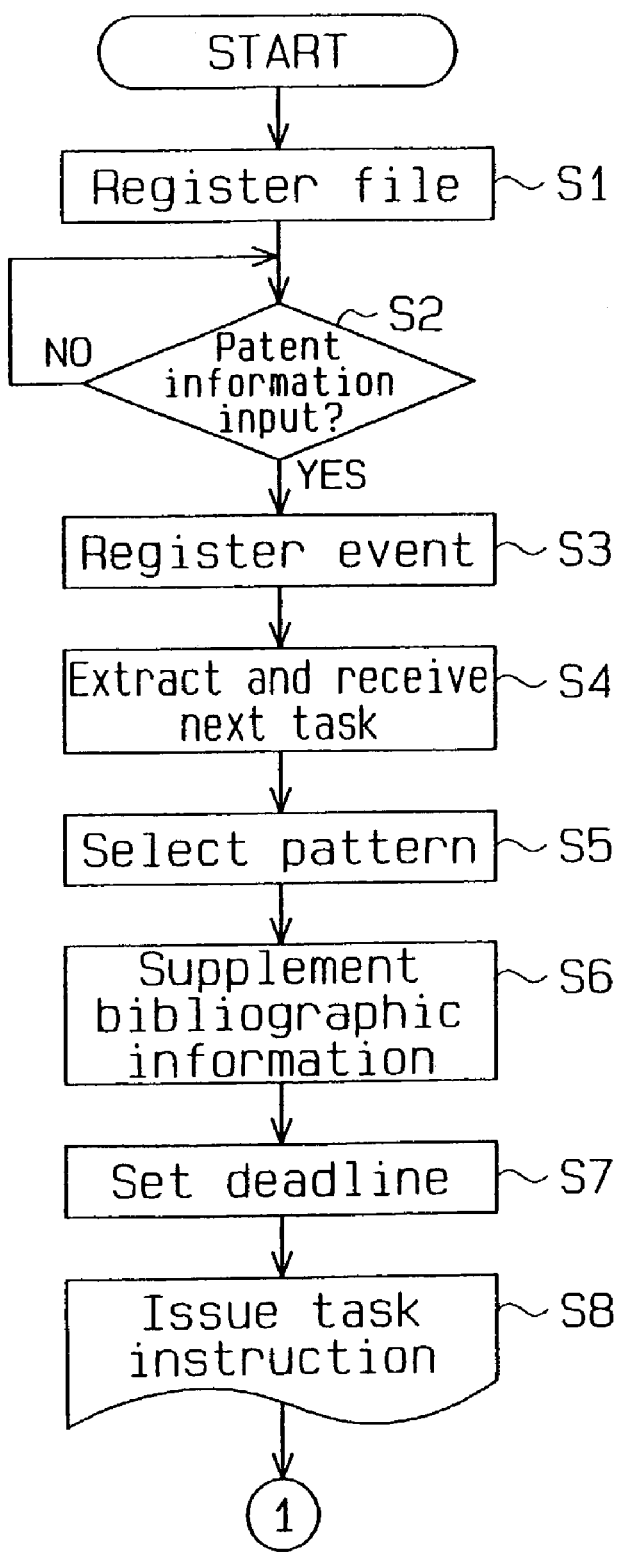
FIGS. 2 and 3 are flowcharts showing an example of a procedure performed by the case management system of FIG. 1.
Figure 3:
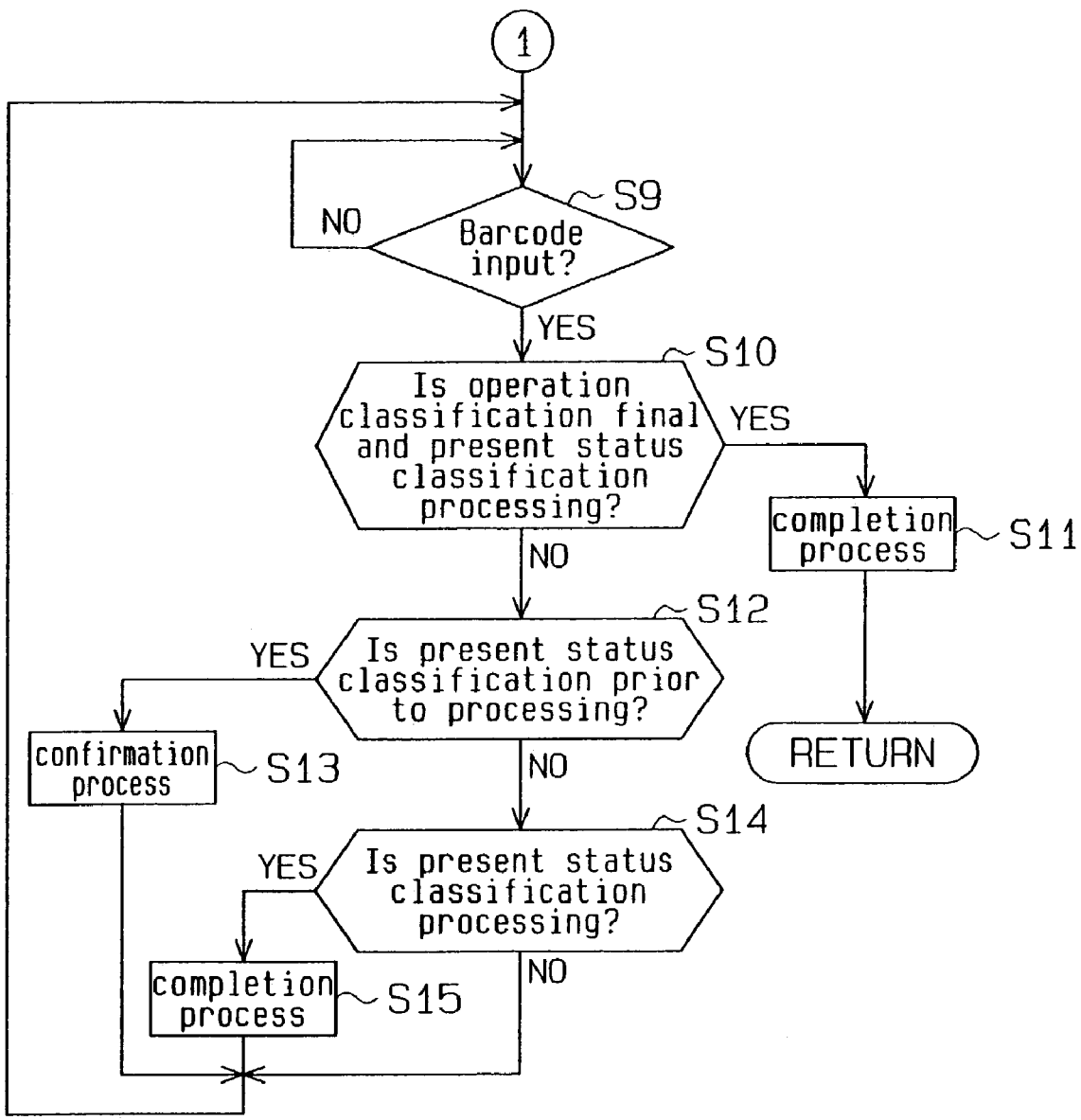

An example of a process performed by the patent management system (case management system) 1 of the first embodiment will now be discussed in detail. FIGS. 2 and 3 illustrate an example of a procedure performed by the patent management system 1. The flowchart of FIGS. 2 and 3 illustrates one example to facilitate the description. Since each type of procedure is performed in response to the operator's input regardless of order, the present invention is actually not restricted to the flowchart of FIGS. 2 and 3. To facilitate the description, the flowchart of FIGS. 2 and 3 illustrates the procedures for only one event and does not illustrate other events.

When the process is initiated (START), the file required to perform patent management is registered (step S1). The term "file" refers to various types of databases, such as an application file 31 (FIG. 11), an event master 32 (FIG. 12), a workflow definition 33 (FIG. 13), and a pattern definition 34 (FIG. 14). In addition, data related with the operation, the staff member in charge, applicant information, applicant master, designated country, country name master, related application information, inventor information, associate master, and section master is stored in a database.

Figures 10, 11:
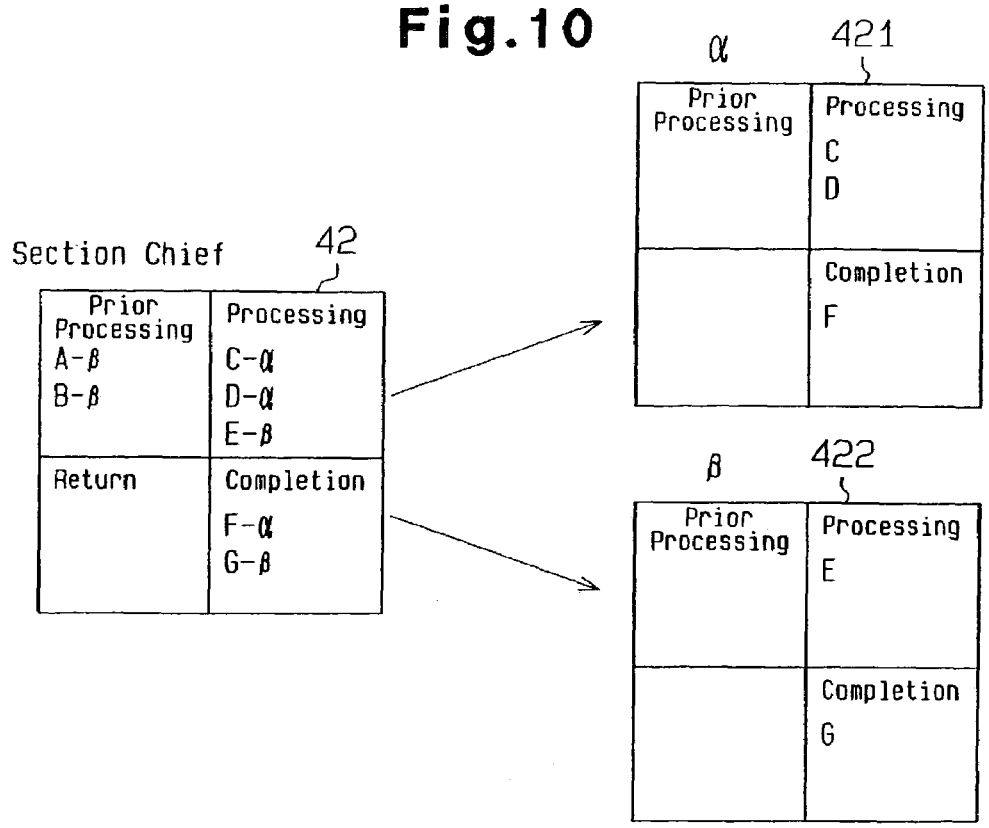
FIG. 10 is an explanatory diagram showing a management page for a section chief and a staff member in the system of FIG. 9.
FIG. 11 is an explanatory diagram schematically showing the stored contents of an application file for the case management system of FIG. 1.

FIG. 11 is a chart schematically illustrating the contents stored in the application file 31, which is one example of a case file. The application file 31 is referred to as an application master, uses its own file number as a key, and is recorded in the database 3 together with bibliographic information before processing an event. The application file stores the file number allocated to each case, a code for the filing country, type of intellectual property law such as patent, utility model, design, and trademark, filing route, such as direct, Paris, PCT, EPC, PCT to EPC, and the application type, such as normal application, PCT application, and domestic priority application. Further, priority date, filing date, filing number, laid-open date, laid-open publication number, examined publication number, examined publication date, date of request for examination, date of notice of allowance, registration date, registration number, appeal number, date of abandonment, application section, main managing section, rank, title of the invention, gist, person in charge of docketing, staff member in charge in the intellectual property section are also stored in an associated record. The application file 31 stored in the database 3, which corresponds to the case file storing means of the present invention.

FIG. 12 is a chart schematically illustrating the contents stored in the event master 32. To locate patent information, conditions are added so that the event master 32 conducts a search through task patterns that are optimal for the patent information. As conditions used for the search, the event master 32 stores country codes, type of intellectual property law, route, task ID indicating the type of task, and task name. Information of whether or not there is a deadline calculation for the task and a calculation pattern when there is a deadline calculation are also stored in the event master 32. Further, when there is a secondary task related with the located task, country codes, type of intellectual property law, route, and secondary task ID are stored in the event master 32. The term "secondary task" refers to the following. For example, when "recording of receipt of notification of reason for refusal", which is an event completed in the docketing section, is registered, another task in which the applicant must respond to the notice of reason for refusal becomes necessary. Thus, a task-event corresponding to the applicant's response becomes necessary. In this manner, an event related with another event is referred to as a "secondary task."

FIG. 13 is a table schematically illustrating the contents stored in the workflow definition 33. The workflow definition 33 defines operations, which are workflow elements. The workflow definition 33 stores pattern numbers specifying pattern of operations, the order of the operations in the pattern, classification of whether the operation is a normal one or a final one, an operation code specifying the operation, staff member classification, which classifies that no staff member is in charge, the staff member in charge in the docketing section, the staff member in charge in the patent prosecution section, or the person in charge being the inventor, and comments.

FIG. 14 is a table schematically illustrating the contents stored in the pattern definition 34. The pattern definition 34 stores pattern numbers, pattern names, country codes, type of intellectual property law, route, and task ID. In relation with a task that is the same as a task specified by the event master 32 (FIG. 12), the pattern definition 34 specifies the pattern name and the pattern number of the pattern that is to be processed. The workflow definition 33 defines the contents of the pattern. The workflow definition 33 and the pattern definition 34 correspond to the workflow memory means of the present invention.

When the registration of a file is completed (S1), the patent management system 1 monitors whether or not patent information has been input (S2). Data transmitted online from the Japanese Patent Office through, for example, the communication device 12, and data extracted from documents mailed from a Japanese court or appeal examiner or a foreign patent firm or patent office may be given as examples of patent information. When information is input online through the communication device 12, the management computer 21 automatically extracts the necessary information such as country code, type of intellectual law, route, and task ID.

Information for the mailed document is manually input with the input device 23. When the patent information is manually input, the display device 22 of the management computer 21 displays a selection page related with the patent information. The selection page shows messages asking whether the patent application is a domestic application or a foreign application, the country name when the application is a foreign application, whether the application route is direct, Paris, PCT, EPC, PCT to EPC, whether the information is for filing, prosecution procedures, or for registration. The operator sequentially selects candidates sequentially shown on the display and inputs the selected candidates to complete the input of the patent information.

When patent information is not input (step S2: NO), the patent management system 1 stands by (step S2: NO→step S2). When the patent information is input (step S2: YES), the patent management system 1 extracts events that are to be processed based on the input country code, the type of intellectual property law, the route, and the type of process. Inherent successive numbers are allocated to the extracted events, which are registered in the event pool 35 (FIG. 15) (step S3). The management computer 21, which performs step S3, corresponds to an event generating means. It is determined from the event master 32 whether the registered event involves a secondary task. When a secondary task is involved, the patent management system 1 extracts the secondary event from the event master 32 and registers the event for the secondary task in the event pool 35 (step S4).

FIG. 15 is a table illustrating the contents stored in the event pool 35. The event pool 35 specifies the tasks that are to be actually specified, collects the necessary information required for processing the tasks, and stores management data based on the updated information, which is constantly updated. The event pool 35 generates a new record when an event is registered and stores the inherent number of the event and the current operation pattern number, which specifies the pattern for processing the event. Further, the event pool 35 stores the present order, which is the order of the present operation in a pattern, the present status, which indicates whether the operation has not been performed yet or whether the operation has been performed, the file number of the case to which the event is related with, and a supplemental task name. Further, the event pool 35 stores data such as deadlines for management purposes, statutory deadlines, registration dates of events, the base dates for calculating deadlines, completion dates on which completion processes are performed, persons in charge of tasks, and completion dates on which confirmation processes are performed. The stored data is referred to as completed history information. The management computer 21 calculates processing deadlines based on predetermined statutory criterions and automatically sets the deadlines. The management computer 21, which performs these procedures, corresponds to the processing deadline setting means of the present invention.

In steps S3 and S4, the task ID of the event master 32 (FIG. 12) specifies which task is to be performed with regard to the events registered in the event pool 35. In the pattern definition 34, task patterns related with the registered event are selected (step S5), and the pattern number of the selected task pattern is stored in the event pool 35 as the present operation pattern number. The management computer 21, which performs step S5, corresponds to a workflow selecting means. In the event pool 35, the present order is set as 1 for initial setting, and the present status is set to indicate that processing has not been performed yet.

The input patent information and the application file (FIG. 11) related with application information are referred to, and bibliographic information, such as the file number, the supplemental task name, and the person in charge of the task are input for the event registered in the event pool 35 (step S6).

From the event master 32, the management computer 21 checks whether or not there is a deadline calculation, and when there is a deadline, reads a calculation pattern and calculates the deadline. The management computer 21 stores the deadline, the statutory deadline, the registration date, and the calculation base date in the event pool 35 (step S7). When data required for management is stored in the event pool 35, afterward, only a starting date and a completion date are NULL.

Figures 4, 5:
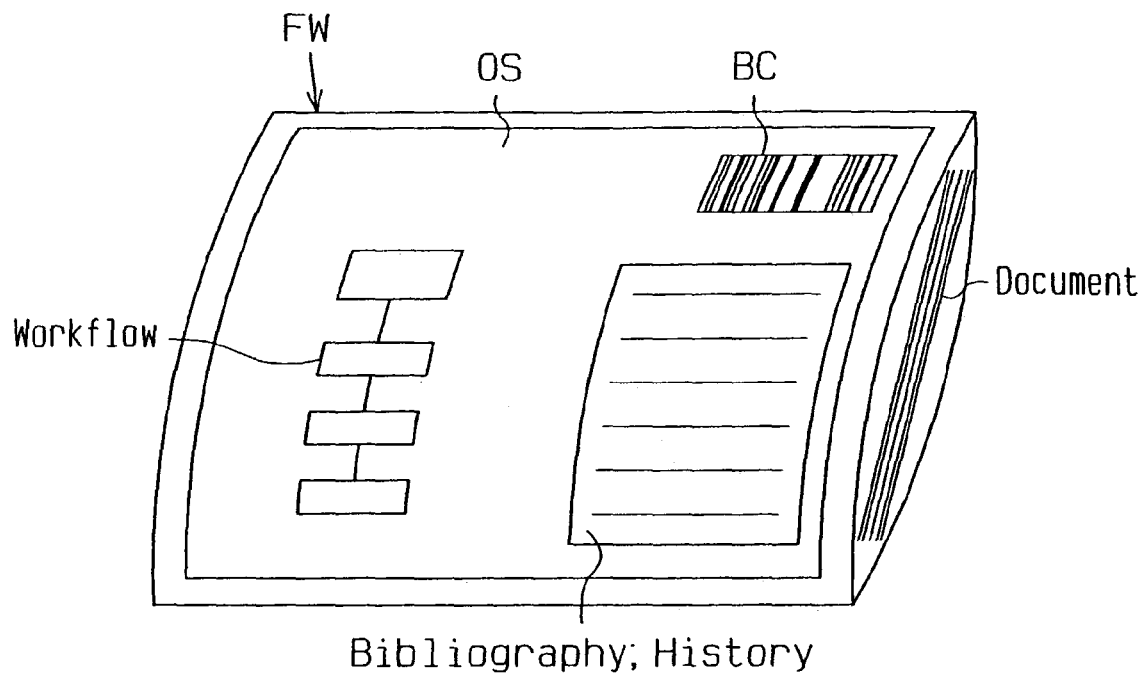
FIG. 4 is a perspective view showing an example of task instructions attached to a file wrapper for the case management system of FIG. 1.
FIG. 5 is an explanatory diagram showing an example of a management page shown on a display of a terminal device in the case management system of FIG. 1.

Then, the task instruction OS is issued (step S8). The task instruction OS is printed from the printer 25 in the management section 2 and attached to the corresponding file wrapper FW, which is retrieved from the archive 13. FIG. 4 is a drawing showing an example of a task instruction OS attached to a file wrapper FW. The file wrapper FW is an envelope-like or binder-like paper file and includes a front cover portion and a portion for holding documents. For example, the task instruction OS is arranged in and attached to a transparent pocket, which is provided on the front cover of the file wrapper FW. A bar code BC, which includes information such as the task ID and the file number of the event (refer to FIGS. 12, 14, and 15), is marked on the task instruction. The pattern of the selected operation is shown on the operation instruction OS as the workflow on the task instruction OS. Further, the section to which the file wrapper FW is to be transferred, the task to be processed in that section, and the staff member in charge in that section are shown on the task instruction OS. The bibliographic information and history required for processing and confirmation are listed from the application file 31 and shown on the task instruction OS.

The flowchart of FIG. 3 will now be discussed.

The file wrapper FW, to which the generated task instruction OS is attached, is retrieved from the archive 13 and scanned in the management section 2 with a bar code reader 24 (step S9: YES). In this state, the task ID and the file number are read and the record for the associated event registered in the event pool 35 is referred to. The present operation number, the present order, and the present status are extracted from the pertinent record, and the necessary workflow definition 33 (FIG. 13) is read. In the subsequent operation, when the operation of the workflow definition 33, which is read during the scanning of the bar code BC, is final and the present status is in a processing state (step S10: YES), there is no processing to be performed next. Thus, the management section 2 returns the file wrapper FW. The bar code BC is scanned to perform a completion process (step S11) and the process is finished (RETURN). In this state, the management section 2 does not complete the task. Thus, the process is continuously performed.

When the read workflow definition 33 indicates that the operation is final and that the present status is one other than a state undergoing processing (step S10: NO) and the present status classification is prior to processing (step S12: YES), a confirmation process for updating the present status during processing is performed (step S13). Then, the process shifts again to the input waiting loop for the bar code BC (step S9: NO→step S9). When the present status indicates undergoing processing (step S14: YES), a completion process for updating the present status to completion is performed (step S15). Then, the process shifts again to the input waiting loop for the bar code BC (step S9: NO→step S9).

When transferring from the management section 2 to the first operation and when one operation is completed, the bar code BC is scanned to perform the completion process (step S15). In this state, the record for the present order of the event pool 35 is incremented by one. That is, transfer to the next operation is performed on data in accordance with the record data for the corresponding event in the event pool 35 and the workflow definition 33 (FIG. 13). After the completion process is performed by scanning the bar code BC, the file wrapper FW is transferred to the next operation in accordance with the task instruction OS. Accordingly, management data indicating the location of the file wrapper FW that is being processed always coincides with the actual file wrapper location.

FIG. 5 is a chart illustrating an example of a terminal management page, which is shown on the display 42 of the terminal computer 41 in the docketing section 4. Three windows, or a prior processing event window 42a, a processing event window 42b, and a completion event window 42c are shown on the management page. Each of the windows 42a, 42b, 42c shows a table containing a file number, the content of a task, and a deadline.

In the event shown in the prior processing event window 42a, the completion process in the management section 2 (S15), which is another section, is completed. However, the confirmation process on the docketing section 4 (step S13), which is the next operation, is not completed. In this state, the file wrapper FW is still in the management section 2. In the event shown in the processing event window 42b, the confirmation process (step S13) is presently being performed in the docketing section 4. Further, the file wrapper FW is in the docketing section 4 and presently being processed.

In the event shown in the completion event window 42c, the actual processing in the docketing section 4 is completed and the bar code BC for the file wrapper FW is scanned to perform the completion process (step S15). However, the completion event window 42c shows that the starting process in the next operation (step S13) has not been completed. The management computer 21, which shows a management page on the display 42, corresponds to an event displaying means of the present invention.

Figure 6:
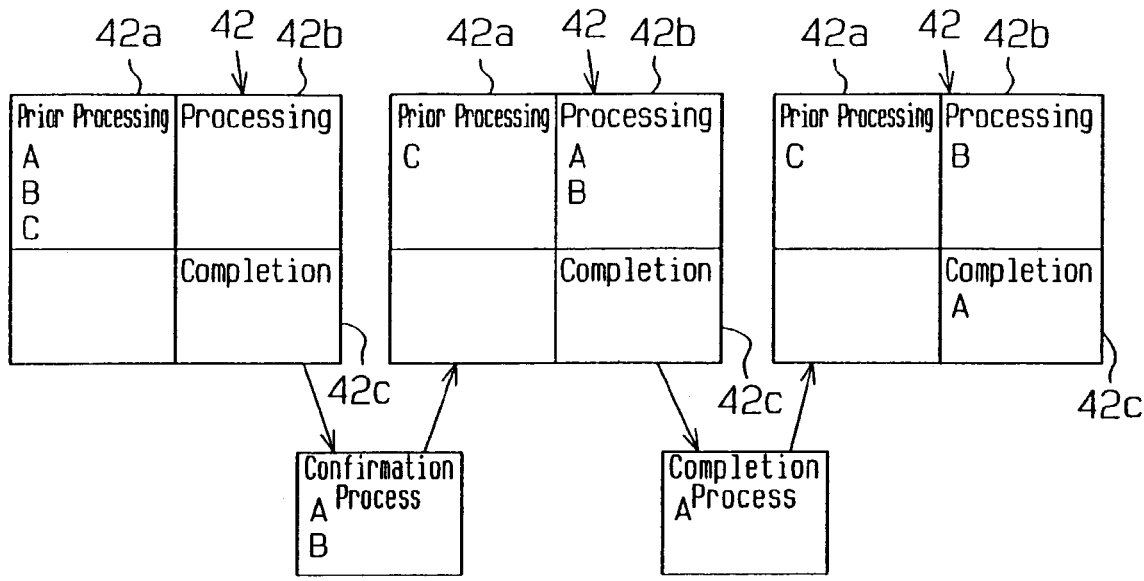
FIG. 6 is an explanatory diagram showing transitions of a confirmation process and a completion process on the management page of FIG. 5.

FIG. 6 is a diagram illustrating the shifting of a page caused by the confirmation process and completion process in the management page of the same terminal. As shown in FIG. 6, with regard to events A, B, and C, which are first shown on the prior processing event window 42a, if the file wrappers FW of the events A, B are received and the bar codes BC are scanned to perform the confirmation process (step S13), the display of events A and B shifts to the processing event window 42b. Further, when the bar code BC of only event A is scanned to perform the completion process (step S15), only event A is shifted to the completion event window 42c.

Figure 7:
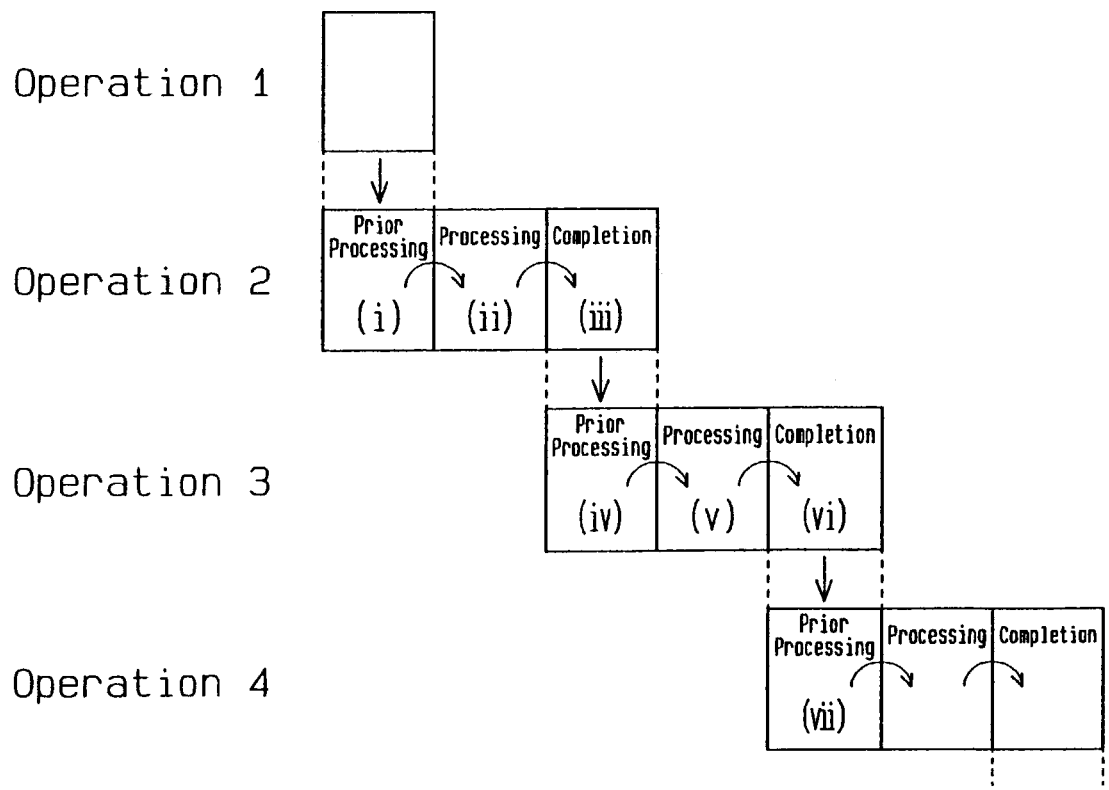
FIG. 7 is an explanatory diagram schematically illustrating a prior processing event window, a processing event window, and a completed event window on the management page of FIG. 5.

The shifting of the terminal management page in successive operations will now be discussed. FIG. 7 is a diagram schematically showing a prior processing window, a processing window, and a completion event window of a terminal management page in each of successive operations.

First, when the registration of an event is completed in operation 1, which is the management section, the event is shown in the prior processing event window (i) in operation 2. When the confirmation process is performed in operation 2, the event is shown on the processing event window (ii). When the completion process is performed in operation 2, the event is shown on the completion event window (iii). When the completion process is performed, the same event as that of the completion event window (iii) is simultaneously shown on the prior processing event window (iv) of operation 3, which is the next operation. When the confirmation process of operation 3 is performed, the contents of the prior processing event window (iv) for operation 3 is transferred to the processing event window (v) and deleted from the completion event window (iii) of operation 2. In the same manner, when the completion process of operation 3 is performed, the event is transferred to the completion event window (vi) and the same event is shown on the prior processing window (vii) of operation 4. Accordingly, when the event is shown on the prior processing window for a long time, this indicates that the file wrapper FW has not been transferred to the next operation for one reason or another even though processing has been completed in the previous operation. Thus, when there is a problem in the transfer of the file wrapper FW, this can be confirmed in the previous operation and in the next operation. Thus, if an error occurs in one operation, a double check is enabled. This significantly decreases man-made mistakes.

Figures 8, 9:
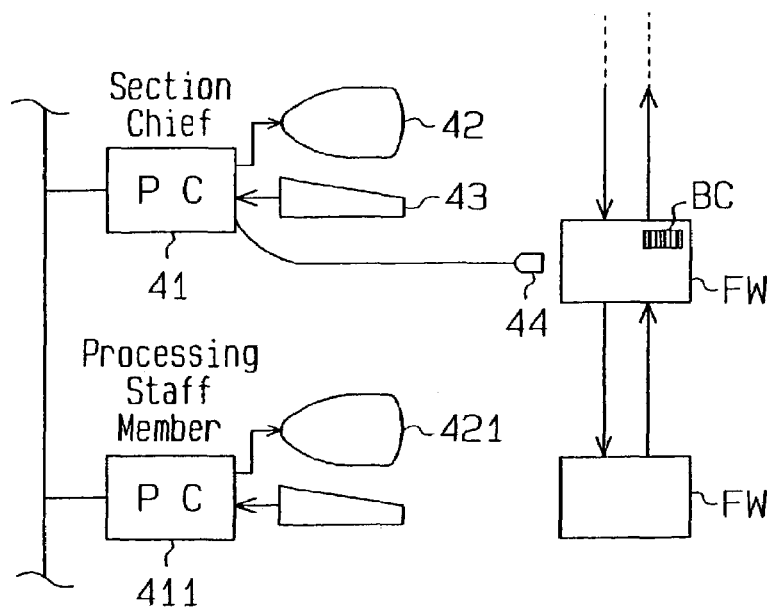
FIG. 8 is an explanatory diagram illustrating a progress page shown on a display in a section managing the case management system of FIG. 1.
FIG. 9 is a schematic diagram showing the system in the same section of the case management system of FIG. 1.

A progress page shown on the display 22 in the management section will now be discussed. FIG. 8 shows the progress page shown on the display 22.

From the records of events stored in the event pool 35, the progress page shows numbers, file numbers, tasks, and deadlines in the same manner as the management page of a terminal and additionally shows operations, present statuses, and remaining number of days. The displayed events are listed from top to bottom in the order of events having earlier deadlines.

The operation column shows the section in which a file wrapper FW is presently located. If the confirmation process is not performed in the next process, it is determined that the file wrapper is in the previous operation. The present status shows a code number indicating whether the case is prior to being processed, is being processed, or has been processed. By listing events from those having earlier deadlines, events to which priority should be given are apparent. This easily and safely manages deadlines. Further, based on the time from which a task is initiated, tasks that have not been completed for a long time may be colored. The remaining days, which are shown in the remaining days column, may be shown using different colors depending on the number of remaining days. By using different colors in the remaining days column, a manager may manage not only the progress of a process but also the contents of the progress. Although not shown in the drawings, the progress page is based on the records of the event pool 35 (FIG. 15) Thus, a page using the person in charge as a key may also be displayed. The management computer 21, which displays the progress page on the display 22, corresponds to the progress page displaying means of the present invention.

FIG. 9 is a schematic diagram showing the system in a single section. In the same section, the terminal computer 41 of a chief and a terminal computer 411 of a staff member in charge of a processing are connected by a LAN. When information is concentrated in a single terminal computer in a section, it becomes difficult to see and manage the information. Thus, the displayed information may be managed in a dispersed state in the section. A single operation corresponds to a single section. Thus, when an operation shifts from a former operation to a latter operation, the information of every event is shifted to and concentrated on the chief's computer.

FIG. 10 shows management pages of a section chief and processing staff members α and β in the section. The "section chief" is the person who manages the event processing staff members α and β, checks whether there are staff members having deadlines that have lapsed, and has the authority to distribute work. Thus, the section chief checks the progress status and re-allocates events to staff members when there is a possibility of a deadline lapsing to use human resources effectively. The section chief may display his or her management page and the management pages shown on the section staff members α and β on the section chief display 42. When events A and B are transferred from a previous operation and the section chief scans the bar code BC of the file wrapper FW, if the processing staff member α has already been stored in the event pool 35, the events A and B are transferred to the processing staff member α.

When the file wrapper FW is transferred in accordance with the section chief's instruction, based on the information stored in the event pool 35, the management computer 21 recognizes that the file wrapper FW is being held by the processing staff member α. When the section chief determines that the staff member α cannot perform the process, the section chief displays the subject event pool 35 on the section chief display 42 and changes the "staff member in charge of task" from staff member α to staff member β. In this case, the management computer 21 recognizes that the file wrapper FW is being held by the new staff member β.

Based on the workload of the staff member, the section chief may change the processing deadline that was set first. In this case, the section chief displays the operation associated with the event pool 35 on the display 42 and changes the item of "deadline" within a range that does not exceed the statutory deadline. The person having the authority to make the change is the section chief. The staff member α may view the event pool 35 from the terminal computer 411 but cannot make changes. The viewing conditions may be changed when necessary. For security reasons, when the data of the management computer 21 is accessed, the access history is recorded, and the history is not accessed from the terminal computer 41, 51, 61.

Further, as shown in FIG. 10, if events C, D, and E are transferred from the previous operation and the section chief instructs staff member α to handle events C and D, and staff member β to handle event E, a page asking for the staff member to be input (not shown) is displayed when the bar codes BC of the associated file wrappers FW are scanned. When the section chief designates and inputs a staff member to the page, the events C and D are shown on the management page of a display 422 of the staff member α in the processing event window. In this case, the section chief distributes the processing of an event in accordance with the work amount of each staff member, and each staff member views only the events that he or she is supposed to process. This facilitates self-management.

With regard to events prior to processing, as shown in FIG. 10, a staff member may be input to instruct staff member β to process events A and B and show the staff member β on a prior processing event window in the display 422 of the staff member β. Completed events F and G may be shown in a completed event window of the management page of each staff member α and β. Further, the section chief may continuously recognize every event and perform management in a further optimal manner.

The patent management system of the first embodiment has the advantages described below.

(1) Based on the patent information input from the communication device, events in which the optimal workflow, bibliographic information, and deadline information are collected and stored in the records for the event pool 35. Thus, in accordance with only the information stored in the records of the event pool 35, deadline management is easily performed. This reduces the number of input operations and prevents errors resulting from inputs. Further, it is guaranteed that data is updated.

(2) The terminal computers 41, 51, 61 of the sections 4, 5, and 6, which perform the actual work in accordance with the workflow, shows events that are to be processed on the management page and the status of events. Thus, a staff member can easily perform deadline management.

(3) In accordance with the processing stage, events are shown in different windows, which are prior processing event, processing event, and completion event windows, in an order based on processing deadlines on the management page. Thus, a staff member may intuitionally recognize the processing stage of each event.

(4) An event, which processing was completed in the preceding operation, is immediately shown in the next operation on the management page. Thus, the staff member in charge of the next operation may immediately start processing, and the staff member in charge of the preceding operation may confirm whether processing has been shifted to the next operation. As a result, the flow of an event is not stopped when operations are shifted.

(5) Due to the event pool storing updated information in a concentrated manner, the progress page shows a specific list of the progress status of every event in an updated state in the management section. Thus, a staff member or a chief may manage each or every step in the workflow. As a result, the staff member or chief may easily perform the management of deadlines in a manner that is complete and optimal for the present state.

(6) The task instruction OS, on which the barcode BC and the workflow is shown, is attached to the file wrapper FW. Thus, the present location of the file wrapper FW is always accurately known. Further, the transfer of the file wrapper FW in accordance with the workflow prevents confusion among the staff members and prevents the file wrapper FW from being sent to the wrong section. Bibliographic information required for processing is collected and shown on the task instruction OS (refer to FIG. 4) of the file wrapper FW. Thus, a search does not have to be performed for the bibliographic information.

(7) The scanning of the barcode BC enables the location management of the file wrapper FW and the acknowledgement of work progress to be performed simultaneously. This significantly reduces errors when inputting data and increases the speed of processing. Further, the management data and the actual location of the file wrapper FW are matched.

(Second Embodiment)

FIG. 16 is a schematic diagram showing a task management system 101 according to a second embodiment of the present invention. The second embodiment is not limited to patent management in the same corporation and may be used when handling cases other than patent cases, such as when outsourcing translations. In this embodiment, a network refers to a wide area network (WAN), or the Internet 9, and the term section includes corporations and patent firms.

A management corporation, or management section 2, serves as an application service provider (ASP) and receives work requests and data from a client corporation 10 through the Internet 9, which serves as a network. The management section 2 stores the data received through the Internet 9 in a database 3. Based on the stored data, the management section 2 generates a storage file FB based on the stored data and stores documents that must be processed in the storage file FB. The storage file FB is another specific example of a storage file according to the present invention.

The storage file FB includes an IC card (IC), which functions as a task instructing means, a recording means, and an identifying means. Data is read from and held in an electrically erasable programmable ROM (EEPROM). Further, a predetermined voltage is applied to the EEPROM to re-write data. More specifically, the IC card stores ID information for identifying events stored in the storage file FB and a workflow indicating processing schedules. Each section reads data from a computer that functions as a reading device, selects a case (event), and confirms a processing workflow.

The task management system 101 includes sections, such as the management corporation (ASP), or the management section 2, a patent firm, or a docketing section 4 and a patent prosecution section 5, a translation company 7, and a foreign patent firm 8. The sections are connected to one another through the Internet 9. The sections are not sections that perform different tasks in the same company but are different organizations sharing work among each other in the task management system 101.

In addition to tasks related with patents, the task management system 101 may be used for tasks that are not directly related with patents, such as the translation of documents and search for prior art. Such tasks may not have statutory deadlines but may have deadlines related with patent work. Further, even if there is no statutory deadline, the present invention may be applied to any type of tasks having deadlines.

Each embodiment may be modified as described below.

The patent management system 1 and the task management system 101 are applied to patent related work. However, the present invention is not limited to patent related word and may be applied to any type of work that involves deadlines. The term "case" in the present invention includes concepts such as private tasks. For example, the present invention may be applied for typical sales tasks such as when setting a delivery date and preparing a product. In this case, tasks, such as order processing, product order, product manufacturing, transportation, accounting processing, and customer management, are referred to as events and associated sections perform the corresponding processing and management of deadlines. Further, the present invention may be applied to perform progress management for a project team in a corporation or to perform maintenance tasks having schedules. Further, the present invention is not limited to the case management systems of the above embodiments and may be applied to any type of system that requires deadline management, such as, a document management system and an order/accounting system.

Patent information is not limited to that of the Japanese Patent Office and includes patent information for foreign patent offices. Patent information may be any information that triggers the generation of an event regardless of the person who sends the information and regardless of the medium of the information. For example, the patent information may be an electronic mail, digital data, such as an FTP file, analog data such as a facsimile transmission, or printed paper medium that is sent from a foreign patent firm, a domestic patent firm when the chief is the applicant, and the applicant when the chief is the patent firm. Further, request for examination deadlines managed by the patent management system 1 are also included in the patent information.

A single event may be generated from predetermined case information and the next operation may be generated in a derived manner in accordance with the generation of the event. Alternatively, a plurality of events may simultaneously be generated from a single event. In this case, the shifting order and division of storage files are recorded on a predetermined workflow.

With regard to inputs from an identifying means, such as a bar code, an input page may be generated on the management computer 21 or the terminal computers 41, 51, 61 by an input program, and the signal of a barcode scanner may directly be input from a PS/2 port or a USB port. A single barcode reader may be shared by a plurality of terminal computers. Alternatively, a barcode reading terminal may be prepared, and the read data may be transferred to each terminal from the bar code reading terminal.

When the location of a file wrapper FW input from an identifying means such as a barcode reader does not match the recorded location of the file wrapper FW, an error page may be displayed to warn that the locations do not match.

If a predetermined time elapses from a processing initiation date, which is input during the confirmation process, an electronic mail may be sent to the staff member in charge of the processing to provide a warning. If a predetermined time elapses from a completion date, which is set in the completion process, an electronic mail may be sent to the staff member in charge of the next operation to provide a warning.

The storage file identifying means, such as the barcodes BC marked on the task instructions OS, may be used to retrieve bibliographic information stored in the application file 31 associated with an event.

A return event window may be arranged in the management page. If the previous operation must be performed again, such as when the processing of a previous operation is inappropriate, the file wrapper FW may be returned so as to reverse the order of operations in the workflow. For example, to perform a return process, when a barcode is input from a barcode reader, an event associated with a file wrapper FW is continuously displayed on the return event window until the confirmation process of the preceding operation is performed. Simultaneously, the event is shown on the prior process event window of the preceding operation. When the confirmation process of the preceding operation is performed, the event is processed again in the preceding operation and the event is deleted from the return event window in the subsequent operation.

In the present invention, "patent" refers not only to patents defined by the Japanese patent law but also includes rights related with utility model laws, design laws, copyright laws, unfair competition laws, copyright laws, and domain names. Further, "patent management" refers to the management of procedures involving filing, submission, requests, appeal, arbitration, and litigation under such laws.

What is claimed is:

1. A method for managing case information with a management computer connected to a database, wherein the management computer communicates with at least a first terminal device and a second terminal device via the network, the method comprising the steps of:

inputting case information involving a processing deadline in the management computer;

generating at least one event, which is a task including a single operation and involving the processing deadline or a task including a series of operations and involving the processing deadline;

storing workflows, which are series of operations determined beforehand in accordance with the type of the generated event, in the database;

selecting a predetermined workflow from the stored workflows;

generating an event pool storing the generated event in association with the selected predetermined workflow in the database; and displaying a management page including the event stored in the event pool on a display of each of the first and second terminal devices in a same manner in accordance with the workflow stored in association with the event, wherein the step of displaying a management page including the event includes displaying the event completed by one of the first and second terminal devices on the display of the one of the first and second terminal devices and replacing the completed event with a prior processing event to display the prior processing event on the display of another one of the first and second terminal devices.

2. The method according to claim 1, further comprising the step of: calculating the processing deadline based on a predetermined reference deadline in accordance with the case information and automatically setting the calculated processing deadline.

3. The method according to claim 1, wherein the step for displaying the event further includes receiving confirmation of initiation of a task related with the event from the first and second terminal devices, and wherein the step for displaying the event includes displaying the prior processing event prior to the initiation and a processing event subsequent to the initiation in a distinguishable manner on the management page in accordance with the confirmation of the initiation to show a processing stage of the event.

4. The method according to claim 3, wherein the step for displaying the event includes displaying the prior processing event, a processing event, and the completed event in different windows on the management page in order of processing deadlines in accordance with the processing stage.

5. The method according to claim 3, further comprising the step of:

displaying a progress page, which includes a list showing a progress status of the event that indicates the processing deadline, the terminal device in which the event is shown, and the processing stage in the terminal device, on at least one of a display of the management computer and a display of each of the first and second terminal devices.

6. The method according to claim 1, further comprising the steps of:

recording the workflow in a task instructing unit attached to a storage file that stores a document related with the event, wherein the storage file includes an identifying unit that identifies the event related with the storage file; and recording information related with the event in the identifying unit.

7. The method according to claim 6, wherein the identifying unit is a barcode, and wherein each of the first and second terminal devices includes a barcode reader.

8. The method according to claim 6, wherein the identifying unit is an electric, magnetic, or optical storage medium, the method further comprising the step of:

reading from the storage medium in each of the first and second terminal devices.

9. The method according to claim 6, further comprising the step of:

identifying the event with the identifying unit in each of the first and second terminal devices to perform a confirmation process that confirms initiation of a task related with the event or a completion process that confirms completion of a task related with the event.

10. The method according to claim 9, further comprising the steps of:

storing a case file, which stores bibliographic information and history information for each case, in the database, wherein the step for storing the case file includes adding the history information to the bibliographic information for the case file by identifying the event by means of the identifying unit.

11. A program for operating a computer that is connected to a database and manages case information, wherein the computer communicates with at least a first terminal device and a second terminal device via a network, the program causing the computer to execute steps comprising:

generating at least one event, which is a task including a single operation and involving a processing deadline or a task including a series of operations and involving the processing deadline, in accordance with input case information, which involves the processing deadline;

storing workflows, which are series of operations determined beforehand in accordance with the type of generated event, in the database;

selecting a corresponding workflow from the workflows stored in the database in accordance with the type of the generated event;

storing the generated event in an event pool generated at the database in association with the selected workflow; and displaying a management page including the event stored in the event pool on a display of each of the first and second terminal devices in a same manner in accordance with the workflow stored in association with the event, wherein the step of displaying a management page including the event includes displaying the event completed by one of the first and second terminal devices on the display of one of the first and second terminal devices and replaces the completed event with a prior processing event to display the prior processing event on the display of another one of the first and second terminal devices.

12. The program according to claim 11, further comprising the step of calculating the processing deadline of the case information based on a predetermined reference deadline to automatically set the processing deadline.

13. The program according to claim 11, wherein the step of displaying the event further including receiving confirmation of initiation of a task related with the event from the first and second terminal devices and displays the prior processing event prior to the initiation and a processing event subsequent to the initiation in a distinguishable manner on the management page in accordance with the confirmation of the initiation to show a processing state of the event.

14. The program according to claim 13, wherein the step for displaying the event includes displaying the prior processing event, the processing event, and the completed event in different windows on the management page in order of processing deadline in accordance with the processing stage.

15. The program according to claim 13, further comprising the step of displaying a progress page, which includes a list showing a progress status of the event that indicates the processing deadline, the terminal device in which the event is shown, and the processing stage in the terminal device, on at least one of a display of the management computer and a display of each of the first and second terminal devices.

16. The program according to claim 11, further comprising the steps of:
recording the workflow in a task instructing unit attached to a storage file storing a document related with the event, wherein the storage file includes an identifying unit that identifies the event related with the storage file; and
recording information related with the event in the identifying unit.

17. The program according to claim 16, wherein the identifying unit is a barcode, and wherein each of the first and second terminal devices includes a barcode reader.

18. The program according to claim 16, wherein the identifying unit is an electric, magnetic, or optical storage medium, the program further comprising the step of:
reading from the storage medium in each of the first and second terminal devices.

19. The program according to claim 16, wherein the program further comprising the step of:
in each of the first and second terminal devices, performing a confirmation process that confirms initiation of a task related with the event or a completion process that confirms completion of a task related with the event in accordance with identification of the event by means of identifying unit.

20. The program according to claim 19, further comprising the steps of:
storing a case file, which stores bibliographic information and history information for each case, in the database, and adding the history information to the bibliographic information for the case file by identifying the event by means of the identifying unit.

21. A case management system comprising:
a management computer that generates at least one event, which is a task including a single operation and involving a processing deadline or a task including a series of operations and involving the processing deadline, in accordance with received case information, which involves the processing deadline;
first and second terminal devices coupled to the management computer via a communication network, wherein each of the first and second terminal devices includes a display; and
a database connected to the management computer that generates workflows, which are series of operations determined beforehand in accordance with the type of generated event, in the database;

wherein the management computer selects a corresponding workflow from the database in accordance with the type of the generated event; and wherein the database includes an event pool for storing the generated event in association with the workflow selected by the management computer;
wherein the management computer displays a management page including the event stored in the event pool on a display of each of the first and second terminal devices in a same manner in accordance with the workflow stored in association with the event,
wherein the management computer displays the event completed by one of the first and second terminal devices on the display of one of the first and second terminal devices and replaces the completed event with a prior processing event to display the prior processing event on the display of another one of the first and second terminal.

22. The case management system according to claim 21, wherein the management computer calculates the processing deadline of the case information based on a predetermined reference deadline to automatically set the processing deadline.

23. The case management program according to claim 21, wherein the management computer receives confirmation of initiation of a task related with the event from the first and second terminal devices and displays the prior processing event prior to the initiation and a processing event subsequent to the initiation in a distinguishable manner on the management page to show a processing state of the event.

24. The case management system according to claim 23, wherein the management computer displays the prior processing event, the processing event, and the completed event in different windows on the management page in order of processing deadline in accordance with the processing stage.

25. The case management system according to claim 23, wherein
the management computer displays a progress page, which includes a list showing a progress status of the event that indicates the processing deadline, the terminal device in which the event is shown, and the processing stage in the terminal device, on the display of each of the first and second terminal devices.

26. The case management system according to claim 23, further comprising:
a display connected to the management computer;
wherein the management computer displays a progress page, which includes a list showing a progress status of the event that indicates the processing deadline, the section in which the event is shown, and the processing stage in the section, on at least one of the display of the management computer and the display of the at least one terminal device.

27. The system according to claim 21, further comprising:
a storage file for storing a document related with the event;
a task instructing unit, attached to the storage file, that instructs a task in accordance with the workflow;
an identifying unit provided in the storage file that identifies the event related with the storage file;
a workflow recording unit, connected to the management computer, that records the workflow on the task instruction unit; and
an event recording unit, connected to the management computer, that records information related with the event in the identifying unit.

28. The system according to claim 27, wherein the identifying unit is a barcode, and wherein each of the first and second terminal devices includes a barcode reader for reading the barcode.

29. The system according to claim 27, wherein the identifying unit is an electric, magnetic, or optical storage medium, and wherein each of the first and second terminal devices includes a reading device for reading data stored on the storage medium.

30. The system according to claim 27, wherein each of the first and second terminal devices performs a confirmation process that confirms initiation of a task related with the event or a completion process that confirms completion of a task related with the event in accordance with identification of the event by means of the identifying unit.

31. The system according to claim 30, wherein each of the first and second terminal devices is arranged in each section that performs a task related with the event.

32. The case management system according to claim 30, further comprising:
a case file storing unit connected to the management computer to store bibliographic information and history information for each case, wherein the case file storing unit adds the history information to the bibliographic information for the case related with the event file and stores the bibliographic information by identifying the event by means of the identifying unit.

33. A case management system comprising:
a management computer that generates at least one event, which is a task including a single operation and involving a processing deadline or a task including a series of operations and involving the processing deadline, in accordance with received case information, which involves the processing deadline;
a terminal device coupled to the management computer via a communication network, wherein each of the management computer and the terminal device includes a display; and
a database, connected to the management computer, that stores workflows, which are series of operations determined beforehand in accordance with the type of generated event, in the database;
wherein the management computer selects a corresponding workflow from the database in accordance with the type of the generated event; and wherein the database includes an event pool for storing the generated event in association with the workflow selected by the management computer;
wherein the management computer displays a management page including the event stored in the event pool on the display of each of the management computer and the terminal device in a same manner in accordance with the workflow stored in association with the event, wherein the management computer displays the event completed by one of the management computer and the terminal device on the display of one of the management computer and the terminal device and replaces the completed event with a prior processing event to display the prior processing event on the display of another one of the first and second terminal devices.

34. A case management system comprising:
a management computer that generates at least one event, which is a task including a single operation and involving a processing deadline or a task including a series of operations and involving the processing deadline, in accordance with received case information, which involves the processing deadline;
first and second terminal devices coupled to the management computer via a communication network, wherein each of the first and second terminal devices includes a display; and
a database, connected to the management computer, that stores workflows, which are series of operations determined beforehand in accordance with the type of generated event, in the database;
wherein the management computer selects a corresponding workflow from the database in accordance with the type of the generated event; and wherein the database includes an event pool for storing the generated event in association with the workflow selected by the management computer;
wherein the management computer displays a management page including the event stored in the event pool on the display of each of the first and second terminal devices in accordance with the workflow stored in association with the event, wherein the management page includes a completion event window and a prior processing window, and
wherein the management computer displays the event completed by one of the first and second terminal devices on the compellation event window of the display thereof and displays the completed event on the prior processing window of the display of another one of the first and second terminal devices.

35. A case management system comprising:
a management computer that generates at least one event, which is a task including a single operation and involving a processing deadline or a task including a series of operations and involving the processing deadline, in accordance with received case information, which involves the processing deadline;
first and second terminal devices coupled to the management computer via a communication network, wherein each of the first and second terminal devices includes a display; and
a database, connected to the management computer, that stores workflows, which are series of operations determined beforehand in accordance with the type of generated event, in the database;
wherein the management computer selects a corresponding workflow from the database in accordance with the type of the generated event; and wherein the database includes an event pool for storing the generated event in association with the workflow selected by the management computer;
wherein the management computer displays a management page including the event stored in the event pool on the display of each of the first and second terminal devices in accordance with the workflow stored in association with the event, wherein the management page includes a completion event window, a prior processing window, and a processing window; and
wherein the management computer displays the event completed by one of the first and second terminal devices on the compellation event window of the display thereof and displays the completed event on the prior processing window of the display of another one of the first and second terminal devices, and wherein when an operation is performed concerning the prior processing event window, the management computer transfers the event of the prior processing event window to the processing event window and deletes the completion event window.

* * * * *